United States Patent
Pai et al.

(10) Patent No.: US 12,062,897 B2
(45) Date of Patent: Aug. 13, 2024

(54) FOAM PROTECTIVE SHELL FOR REFRIGERATOR CONNECTORS

(71) Applicants: TE Connectivity Italia Distribution S.r.l., Turin (IT); TE Connectivity Solutions GmbH, Schaffhausen (CH)

(72) Inventors: Rajendra Pai, Bangalore (IN); Deepan Ponraj Muthupandi, Bangalore (IN); Piero Rolfo, Turin (IT); Stefano Antonacci, Turin (IT); Fabrizio Longo, Turin (IT)

(73) Assignees: TE Connectivity Italia Distribution S.r.l., Tornino (IT); TE Connectivity Solutions GmbH, Schaffhausen (CH)

( * ) Notice: Subject to any disclaimer, the term of this patent is extended or adjusted under 35 U.S.C. 154(b) by 368 days.

(21) Appl. No.: 17/667,127

(22) Filed: Feb. 8, 2022

(65) Prior Publication Data
US 2022/0255305 A1    Aug. 11, 2022

(30) Foreign Application Priority Data
Feb. 8, 2021  (IT) .......................... 102021000002711

(51) Int. Cl.
*H02G 3/14* (2006.01)
*F16L 43/00* (2006.01)
(Continued)

(52) U.S. Cl.
CPC .............. *H02G 3/26* (2013.01); *F16L 43/008* (2013.01); *F16L 43/02* (2013.01); *H02G 3/0406* (2013.01); *F25D 2400/40* (2013.01)

(58) Field of Classification Search
CPC ...... H02G 3/26; H02G 3/0406; H02G 3/0633; H02G 3/22; F16L 43/008; F16L 43/02;
(Continued)

(56) References Cited

U.S. PATENT DOCUMENTS

| | | | | |
|---|---|---|---|---|
| 3,936,129 A | * | 2/1976 | Guy ..................... | H01R 13/516 439/468 |
| 4,035,051 A | * | 7/1977 | Guy ..................... | H01R 13/516 439/468 |

(Continued)

FOREIGN PATENT DOCUMENTS

| | | |
|---|---|---|
| DE | 102006040375 A1 | 3/2008 |
| EP | 1710874 A2 | 10/2006 |

(Continued)

OTHER PUBLICATIONS

Extended European Search Report, Application No. 22155310.0-1201, Dated: Jun. 28, 2022, 11 pages.

(Continued)

*Primary Examiner* — Alexander Gilman
(74) *Attorney, Agent, or Firm* — Barley Snyder

(57) ABSTRACT

A connector assembly for installation on a wall includes a main connector body introduced into a cut-out hole of the wall and a protective shell positioned on an inner side of the wall. The protective shell protects the main connector body from an insulation foam entering the main connector body when foamed in place. The protective shell has a front portion, a receptacle formed at the front portion and receiving a second end of the main connector body, a flange extending from and surrounding the receptacle, and a lead-through channel formed at a back portion of the protective shell. The flange is attached on the inner side of the wall and covers the cut-out hole. The lead-through channel has an internal flap routing a cable through the back portion in a meandering manner. The internal flap is inclined with respect to the lead-through channel.

16 Claims, 7 Drawing Sheets

(51) Int. Cl.
*F16L 43/02* (2006.01)
*H02G 3/00* (2006.01)
*H02G 3/04* (2006.01)

(58) Field of Classification Search
CPC . F25D 2400/40; F25D 23/065; H01R 13/502; H01R 13/5202; H01R 13/582; H01R 13/5833; H01R 13/516; H01R 13/743; H01R 13/52; H01R 13/73
USPC .......................................................... 439/559
See application file for complete search history.

(56) References Cited

U.S. PATENT DOCUMENTS

| | | | | |
|---|---|---|---|---|
| 6,257,914 | B1* | 7/2001 | Comerci | H01R 13/6273 |
| | | | | 439/357 |
| 6,508,666 | B1* | 1/2003 | Francis | H01R 13/745 |
| | | | | 439/282 |
| 7,201,590 | B1* | 4/2007 | Chen | H01R 13/5205 |
| | | | | 439/142 |
| 8,791,374 | B1* | 7/2014 | Smith | H02G 3/0616 |
| | | | | 174/530 |
| 9,466,960 | B2* | 10/2016 | Takeuchi | H02G 3/32 |
| 9,640,966 | B1* | 5/2017 | Smith | H02G 15/117 |
| 9,698,518 | B1* | 7/2017 | King, Jr. | H01R 13/52 |
| 9,865,972 | B2* | 1/2018 | Smith | H01R 13/743 |
| 10,530,091 | B2* | 1/2020 | Jansen | H01R 13/743 |
| 10,601,189 | B1* | 3/2020 | Smith | H01R 13/745 |
| 10,741,966 | B2* | 8/2020 | Teba | F21S 41/192 |
| 11,411,331 | B2* | 8/2022 | Wu | H01R 13/741 |
| 2003/0224649 | A1* | 12/2003 | Vista, Jr. | H01R 13/504 |
| | | | | 439/449 |
| 2005/0164543 | A1* | 7/2005 | Dang | H01R 13/5841 |
| | | | | 439/468 |
| 2008/0070435 | A1* | 3/2008 | Chen | H01R 13/5837 |
| | | | | 439/320 |
| 2009/0298332 | A1* | 12/2009 | Murr | H01R 13/743 |
| | | | | 439/545 |
| 2012/0276778 | A1* | 11/2012 | Figie | H01R 13/6581 |
| | | | | 439/607.47 |
| 2014/0322961 | A1* | 10/2014 | Wu | H01R 13/506 |
| | | | | 439/456 |
| 2018/0019041 | A1* | 1/2018 | Takahashi | H01B 7/0045 |
| 2018/0331457 | A1* | 11/2018 | De Renzis | H05K 7/1472 |
| 2019/0148873 | A1* | 5/2019 | Poterjoy | H01R 13/501 |
| | | | | 439/587 |
| 2019/0157803 | A1* | 5/2019 | Fujiki | H01R 13/5221 |
| 2021/0104843 | A1* | 4/2021 | Tobey | H01R 43/01 |
| 2022/0255305 | A1* | 8/2022 | Pai | F25D 23/065 |

FOREIGN PATENT DOCUMENTS

| | | |
|---|---|---|
| EP | 1710874 A3 | 10/2006 |
| WO | 2008025647 A1 | 3/2008 |

OTHER PUBLICATIONS

Italian Search Report, App No. 202100002711, dated Oct. 19, 2021, 11 pages.

* cited by examiner

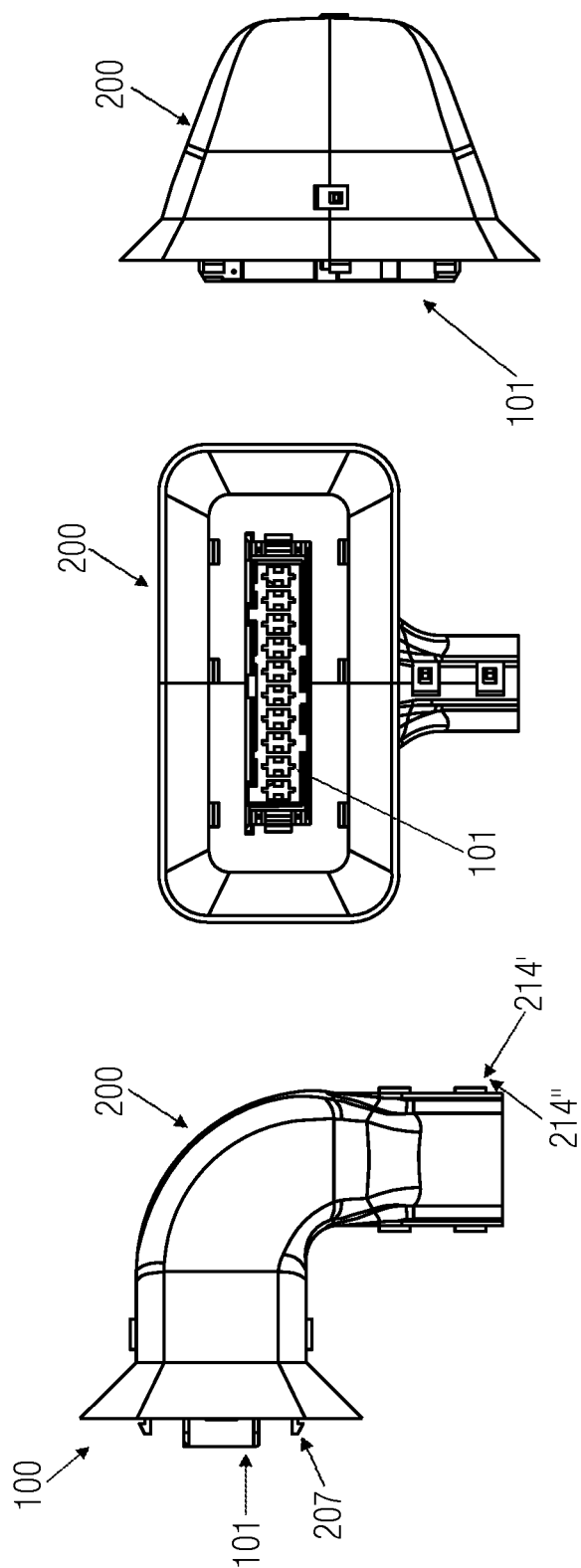

FOAM PROTECTIVE SHELL FOR REFRIGERATOR CONNECTORS

CROSS-REFERENCE TO RELATED APPLICATIONS

This application claims the benefit of the filing date under 35 U.S.C. § 119(a)-(d) of Italian Patent Application No. 102021000002711, filed on Feb. 8, 2021.

FIELD OF THE INVENTION

The present invention relates to a connector assembly to be installed on a wall, and in which a shell encapsulates a connector and offers protection against insulation foam from entering the connector.

BACKGROUND

In the appliance industry, a plurality of connectors assemblies are used for mounting connectors on a wall and providing a connection between elements arranged on one side of the wall with elements provided on the other side of the wall. Those elements are often then sprayed with foam insulation material.

EP1710874A discloses a device for fixing a wire harness in an inner liner of a refrigerator filled with insulation foam. The device includes a housing for receiving wire and harness terminals inserted thereto. The housing has one end inserted and fixed with latches to a fixing hole formed in the inner liner. A deformable cover integrally formed at a middle portion of the housing extends radially therefrom at an angle and covers the fixing hole in order to prevent the insulation foam from leaking to the outside of the inner liner through a gap between the housing and the fixing hole. A cap member is attached to another end of the housing inside the inner liner. The cap member comprises a pair of hinge couplers connected through narrow sections to the cap member. Soft sealing members surround the wire harness, further preventing a leakage of the insulation foam, when the hinge couplers are pivoted towards and latched to each other.

The main advantage of such a system when compared to other more conventional systems is that, based on this construction, leakage of the foam insulation material to the outside of the inner liner of the refrigerator is prevented. However, the main disadvantage is that the foam insulation material can still accidentally enter the body portion accommodating the wires, inside the cap and, if this is the case, there is the risk that the foam solidifies around the wires, making it impossible to perform any maintenance work and wire replacement.

Additional solutions in the market foresee the use of tapes or adhesives, such as hotmelt, to seal the gaps between the housing and the inner liner, but those systems are difficult to assemble and to install.

International Patent Application Publication No. WO 2008025647 relates to a backing part, which is mountable on a foam side of a refrigerator wall for positioning electrical contacts, e.g. of a switch or other electrical components, relative to a window cut out in the wall. The backing part comprises a front housing and a rear housing monolithically connected by a neck section. The front housing is surrounded by a circumferential sealing lip, which is pressed against an end face of the wall. Further, a plurality of ribs and pins protrudes from the front housing and engages with windows cut out in a horizontal leg of the wall for securing the backing part. The rear housing is constructed from a lower part and a lid monolithically connected via film hinges. The lid carries a plurality of latching hooks, which engage with latching eyelets on the lower part of the rear housing. According to one aspect, an electrical cable extends through a labyrinth centrally-located chamber of the rear housing, in which the cable is forced to meander past alternately projecting transverse webs. The labyrinth chamber prevents ingress of foam into via the cable; the cable is preferably routed through a labyrinth multiply curved chamber. Around the labyrinth chamber there are, on the front side of the backing piece, also auxiliary chambers. These auxiliary chambers are chambers in which the foam, which may penetrate accidentally, can expand, before it penetrates and reaches the centrally-located chamber. The further advance to the central chamber may be inhibited, if not stopped. This system has the disadvantage of having a very complex geometry, which is designed to fit specific set of cables and electrical contacts. The penetration of foam also may not completely be prevented.

SUMMARY

A connector assembly for installation on a wall includes a main connector body introduced into a cut-out hole of the wall and a protective shell positioned on an inner side of the wall. The protective shell protects the main connector body from an insulation foam entering the main connector body when foamed in place. The protective shell has a front portion, a receptacle formed at the front portion and receiving a second end of the main connector body, a flange extending from and surrounding the receptacle, and a lead-through channel formed at a back portion of the protective shell. The flange is attached on the inner side of the wall and covers the cut-out hole. The lead-through channel has an internal flap routing a cable through the back portion in a meandering manner. The internal flap is inclined with respect to the lead-through channel.

BRIEF DESCRIPTION OF THE DRAWINGS

The invention will now be described by way of example with reference to the accompanying Figures, of which:

FIG. 6 is a side view of the connector assembly;

FIG. 7 is a front view of the connector assembly;

FIG. 8 is a top view of the connector assembly;

DETAILED DESCRIPTION OF THE EMBODIMENTS

The present invention will now be more fully described hereinafter with reference to the accompanying drawings, in which exemplary embodiments of the invention are shown. The present invention may, however, be embodied in many different forms and should not be construed as limited to the embodiments set forth herein. Further modifications and variations of the present invention will be clear for the person skilled in the art. The present description is thus to be considered as including all said modifications and/or variations of the present invention, the scope of which is defined by the claims.

Figure 1:
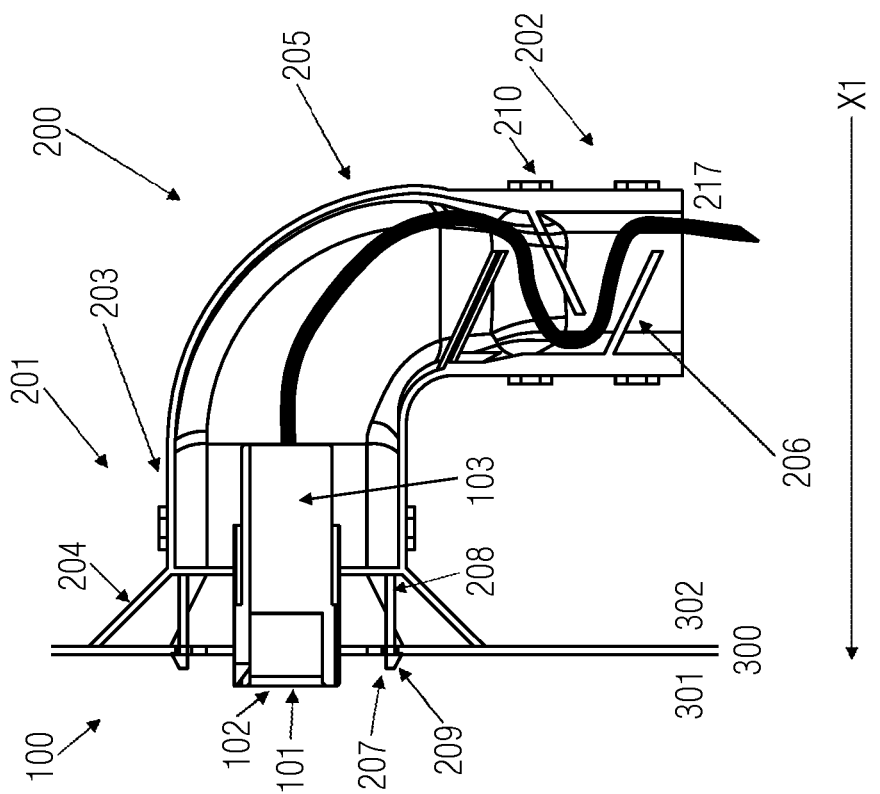
FIG. 1 is a sectional side view of a connector assembly according to an embodiment.

FIG. 1 shows the connector assembly 100 according to an embodiment of the present invention. The invention relates to a connector assembly 100 which is to be attached to a wall 300, such as the wall of a house appliance, in particular a refrigerator. When the term refrigerator is used, it is intended to include both fridge and freezer. The wall 300 has an outer side 301, or appliance side, or refrigerator side, and an inner side 302, or foaming side. When a house appliance, in particular a refrigerator, is installed into a wall, a foam is introduced into the inside of the refrigerator for providing an insulation layer.

The connector assembly 100 can be made of different materials, such as for example, Polyamide 66, which has a good slide and wear properties, is electrically insulating, has good wear properties and high strength. As an alternative material, Polypropylene, PBT or other polymers can be used. Considering the flexibility requirement of the latches and the flange described below, an unfilled polymer may be used.

The connector assembly 100 comprises a connector 101, as shown in FIG. 1, which comprises a first portion or first end 102 and a second portion or second end 103. The connector 101 is inserted into a cut hole 303 of the wall 300 by a sliding action along a direction X1. After insertion, the first portion 102 of the connector 100 will extend out of the wall 300, on the outer side 301 or refrigerator side, while the second portion 103 protrudes out the other side of the wall 300, on the inner side 302 or foaming side. The connector 101 is configured to accommodate electrical connecting devices for providing an electrical contact between the first end portion 101 and the second end portion 102. The connector 101 can, for example, be a RAST connector, in particular a RAST 2.5 or RAST 5 connector.

Around the connector 101, on the inner side or foaming side 302 of the wall 300, a protective shell 200 is installed as shown in FIG. 1. The protective shell 200 is configured to protect the connector body 101 from the insulation foam flowing during the application. The protective shell 200 has a front portion 201 and a back portion 202. In an embodiment, the protective shell 200 is formed by three pieces.

Figure 3:
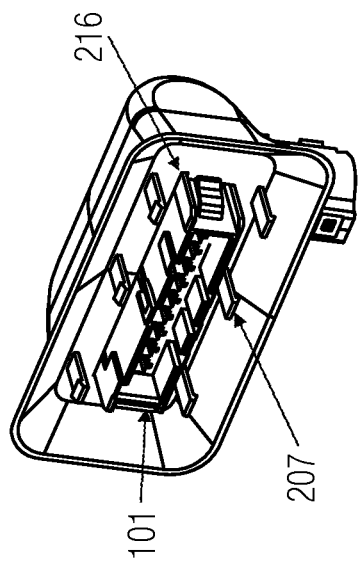
FIG. 3 is a front perspective view of the connector assembly.

As shown in FIG. 3, the protective shell 200 comprises a receptacle 203 formed at the front portion 201 and configured to receive the second end 103 of the main connector body 101. The receptacle 203 can have various dimensions, depending on the type of connector which it needs to accommodate, and has a substantially rectangular cross section.

Extending from and surrounding the receptacle 203, as shown in FIG. 1, there is a flange 204 which abuts against the inner side 302 of the wall 300 and covers the cut hole 303 of the wall 300. The flange 204 can have different sizes, shapes and can be formed of the same or different materials as the receptacle 203. For example, the flange 204 can be formed of a more flexible or elastic material, so to assure adaptability during installation. A flange 204 made of elastic material can easily deform and adapt its shape when pressed between the receptacle 203 and the wall 300, providing an additional sealing function. Alternatively, a flange 204 can be used which is made of the same material as the receptacle 203 and the protective shell 200, to assure having a compact structure minimizing the risk of liquid foam entering within the shell 200 and getting in contact with the main connector body 101. Having the flange 204 of the same plastic material as the receptacle 203 and lead-trough channel 205 makes the manufacturability of the protective shell 200 easier. In an embodiment, a front of the flange 204 has a rectangular shape with rounded corners.

Integrated with the flange 204, there are also fastening elements 207 shown in FIG. 1 which extend from the inside of the flange 204 toward the outer side or refrigerator side 301, along a direction parallel to the direction of insertion X1 of the main connector body 101 into the cut-out hole 303. The fastening element 207 can vary in dimension, distribution, shapes and number. The position and the number of fastening elements 207 can be changed arbitrarily. Each fastening element 207 consists of a straight sliding portion 208 and a locking portion 209. In the cross section of FIG. 1, two fastening elements 207 are represented. The straight sliding portion 208 is an elongated portion extending from the inner front plane 216 or internal wall of the flange 204, positioned within the inner space defined by the flange 204 on the inner side or foaming side 302 of the wall 300, while the locking portion 209 is positioned at the end of the fastening element 207 and protrudes outside the wall 300 on the outer side or refrigerator side 301. As further described with reference to FIG. 9, the locking portions 209 are pressed or clipped inside cut-holes 304 surrounding the cut-hole 303 accommodating the main connector body 101. Once the fastening elements 207 are clipped in the cut-holes 303, the protective shell 200 is fixed on the wall 300. The flange 204 unilaterally covers the cut-out hole 303 in the wall from the foaming side while allowing access to the connector 101 through the cut-out hole 303 from the refrigeration side opposite to the foaming side.

On the side of the receptacle 203 opposite to that where the flange 204 portion starts, formed at the back portion 202 of the protective shell 200, there is a lead-through channel 205, as shown in FIG. 1, which has a curved portion and a straight portion. The channel 205 has internal flaps 206 which are essential for routing the cables 217 of the connector through the back portion 202 of the shell 200 in a meandering manner, which flaps 206 are inclined with respect to the lead-through channel 205. The lead-through channel 205 contains at least one flap 206, and in other embodiments two or three, but it can contain also a higher numbers of flaps 206. Flaps 206 can be made of the same plastic material of the protective shell 200, or of a different plastic or metallic material. The material of the flaps 206 must be such that it does not create friction with the cable's coating rubber material, so that the cables 217 can be easily pulled out if needed. The lead-through channel 205 can incorporate different types of cables 217, including single cables or bunches of cables.

In an embodiment, the flaps 206 are inclined at least 60 degrees, or 70 degrees with respect to the lead-through channel 205. An inclination of the internal flaps 206 formed within a lead-through channel 205 is needed to prevent the liquid foam from flowing through, before it solidifies, so to avoid accumulation of the liquid foam around the cable. The foam has indeed the tendency to solidify. This is especially important towards the back end of the channel 205. Smaller angles may compromise the proper flow of the foam.

In an embodiment, the front end of the shell 200 and the back end of the shell 200 may be arranged at a relative angle between 80 and 100 degrees, or at an angle of 90 degrees. During installation, the lead-through channel 205 provides an orientation for routing the bunched cables and the entire shell assembly can be oriented in such a way that the lead-through channel 205 is facing downwards or is oriented at an angle of ±10 degrees from the vertical line. This orientation provides more effectiveness in preventing the liquid foam from entering the shell 200.

This solution protects the main connector body 101 and terminal interface area against insulation foam entering the connector when the shell 200 and the connector 101 are foamed in place, preventing the leakage of insulation foam through the cut-hole 303 in the refrigerator wall 300. The flaps 206 as well as the lead-through channel 205 are designed in such a way to prevent accidental entry of foam, even when the foam fills the space between the walls and raises from the bottom. The foaming is done by putting a pressurized liquid inside between the external metal and plastic refrigerator, which then solidifies. This design is secured against accidental entry of foam in the lead-through channel 205. This construction ensures that the foam does not reach the connector 101 and terminal and solidifies before reaching the lead-through channel 205. This will later facilitate the maintenance process of changing the cable because the foams cannot accumulate and solidify around the cables.

In the section view of FIG. 1, latching elements 210 are visible. Those are integral parts of the protective shell 200 and are needed to keep the two halves of the protective shell 200 closed together. The function of the latching elements 210 will become clear from the details of FIG. 4 and FIG. 5.

As shown in the figures, the receptacle 203, the flange portion 204 with the fastening elements 207, and the lead-through channel 205 are integrally provided. This assures more stability to the structure, and will assure getting a stable connection between the protective shell 200 and the wall 300, then sealed by the flange 204 which is surrounding the fastening elements 207 and which is flexible to adapt his shape around the main connector body 101.

Figure 2:
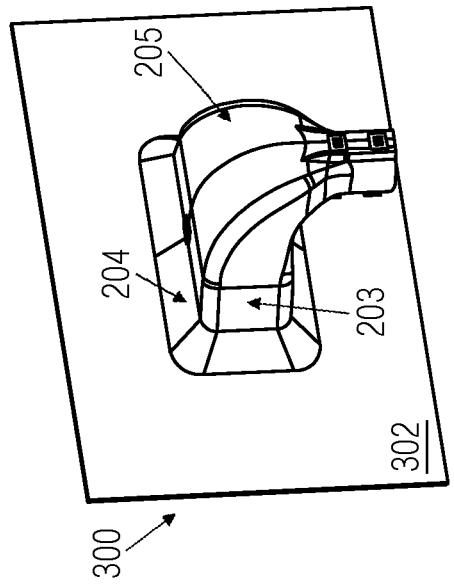
FIG. 2 is a rear perspective view of the connector assembly.

FIG. 2 shows a three-dimensional rear view of the protective shell 200 of the connector assembly 100, which is installed on the wall 300. All main elements of the shell 200 are represented, i.e. the receptacle 203, the flange 204, the lead-trough channel 205 and the latching elements 210. The dimensions of the protective shell 200 can vary in dependence of the specific use of the connector assembly 100, the dimensions and thickness of the wall 300, the dimensions and shape of the main connector body 101. For example, the protective shell 200 can have a width of about 100 mm, which corresponds to the width of the flange 204, a height of about 70 mm, or 75 mm which is measured from the bottom of the lead-trough channel 205 to the top of the flange 204, and a depth of about 60 mm, or 59 mm, which basically corresponds to the depth of the flange 204, receptacle 203 and lead-trough channel 205 together. In FIG. 2 also the inner side or foaming side 302 of the wall 300 is represented.

FIG. 3 schematically shows a three-dimensional frontal view of a connector assembly 100, from the front side. The first end 102 of the main connector body 101 is visible and some details of the structure of the flange 204. The back end of the flange 204 is actually closed by a front plane or internal wall 216, which is made of the same shell material, from which the fastening elements 207 extend. In the FIG. 3, six fastening elements 207 are represented, distributed symmetrically around the main connector body 101. In particular there are three fastening elements 207 on the upper portion of the flange 104, and three on the lower portion of the flange 104, so to have three fastening elements 207 above and three fastening elements 207 below the main connector body 101. The symmetrical distribution will allow an even distribution of the pressure applies to the wall 300 when the connector assembly 100 is installed to the wall 300. As shown in FIG. 3, each straight sliding portion 208 of the each fastening element 207 has a flat shape and can have a width of around 10 mm, or 6 mm and a thickness of about 5 mm, or 3 mm. The concavity of the flange 204 facing the connector wall 300 (not represented) also is clearly visible on FIG. 3. The concavity is configured to be slightly deflected when in contact with the wall 300 to assure a tight contact with the wall 300. This solution enables installation on different types of walls, without the requirement that the walls need necessarily the same thickness or a homogeneous surface. The deformation of the flange portion will balance the possible irregularities on the inner surface of the wall. Therefore, with such a solution a high precision of the wall thickness is not required and cheaper methods for the productions of the wall are allowed to be used.

Figure 4:
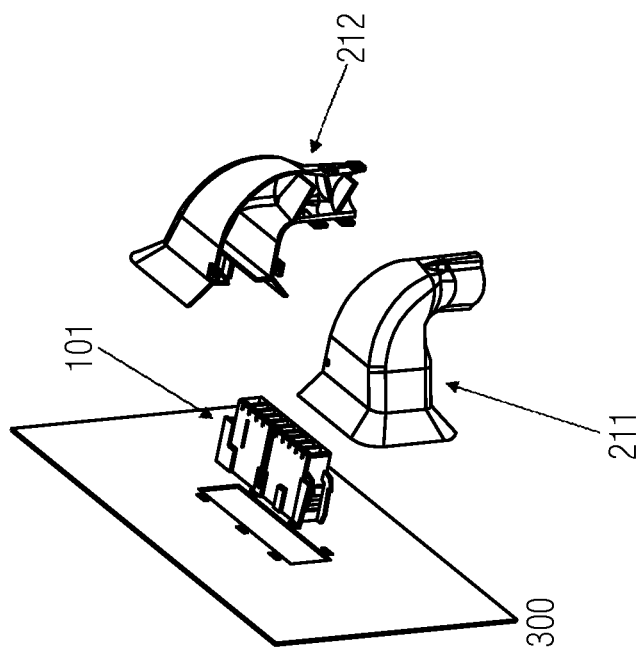
FIG. 4 is a rear perspective view of the connector assembly with a protective shell having a pair of symmetrical parts.

FIG. 4 schematically show a three-dimensional rear view of the connector assembly 100 before the installation in the wall 300. As shown in FIG. 4, the connector 101 is installed on the wall 300 by insertion in the main cut-hole 303, and the protective shell 200 is then installed on the connector 101. The shell 200 comprises two symmetrical halves 211 and 212 which are a left and right adaptors and which then get connected and latched together closing the latching elements 210. The halves 211, 212 are symmetrical around a second direction perpendicular to the direction of insertion or first direction X1. Being made of two halves, the operation of installation and maintenance of the protective shell 200 around the connectors and cables are facilitated. The latching elements 210 can be film hinges or complementary latching elements with two counterparts 214' and 214", shown in FIG. 5. Once the left and right adaptors 211 and 212 of the shell are connected, the fixing elements 207 of the flange 204 get pushed against the cut-holes 304.

Figure 5:
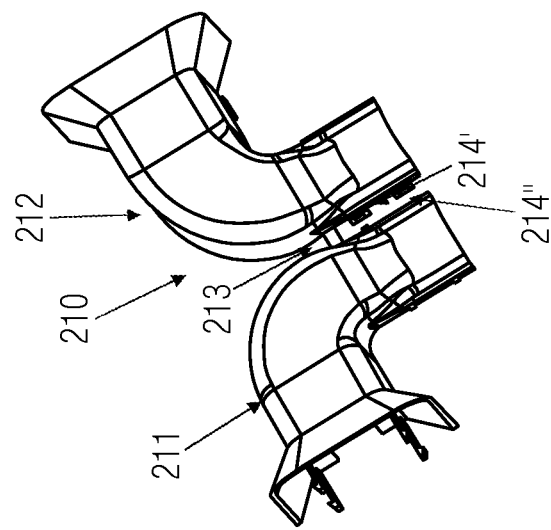
FIG. 5 is a perspective view of the pair of symmetrical parts of the protective shell.

FIG. 5 shows the same protective shell 200 of FIG. 4 viewed from another perspective, with details of the counterparts 214' and 214" of the two latching elements 210. The counterparts 214' and 214" are complementary structured to be pressed one against each other. The part 214' of the latching element 210 has a slot or groove in which the part 214" will be inserted. The protective shell 200 can comprise more elements 214' and 214" along the length, as it is visible in FIGS. 6 to 8. The element 213 serves two purposes. It allows molding of the two symmetrical halves 211 and 212 in the same tool, during the injection molding process, so that the complete shell is manufactured in one tool and one machine. Additionally, the part 213 holds the two symmetrical halves 211 and 212 together from the molding until the assembly stage, so that the person who is assembling the shell 200, does not need to pick two different halves and check for the correct orientation during the assembly process. At a later stage of the assembly process, the element 213 can be broken and removed. This greatly helps in improving productivity during assembly of the connector 101 with the protective shell 200.

FIGS. 6, 7, 8 show the three-dimensional view of the connector assembly 100, from three different perspectives, side, front and top. In FIGS. 6 and 8 it is well visible that the first end 102 of the main connector body 101 sticks out the flange portion 204 so to be installed in the wall 300 ready to be then connected to the appliance.

Figure 9:
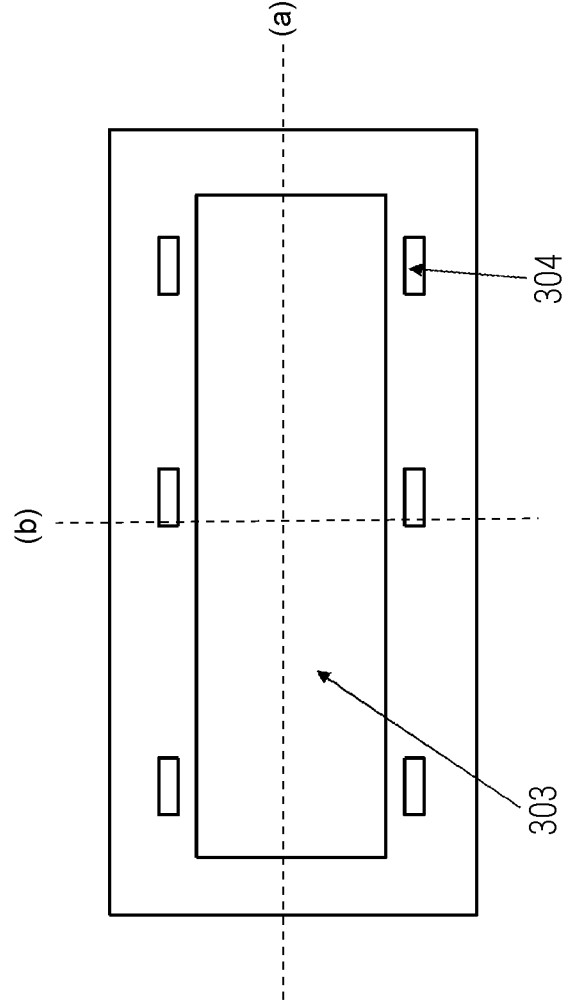
FIG. 9 is a front view of a wall.

FIG. 9 represents some details of the appliance or refrigerator wall 300. As previously explained, the main cut-hole 303, suitable to accommodate the connector 101, is in the middle. Above and below that cut-hole 303, symmetrically distributed, are the smaller cut-holes 304, suitable to accommodate the fastening elements 207 protruding from the flange 204 internal wall. The large cut-hole 303 is 70 mm±1 mm wide and 20 mm±1 mm high and can accommodate the connector assembly 100 of FIG. 2. Those dimensions are just provided as an example. The cut-holes can have various dimensions, based on the size of the connector which it needs to accommodate. The width can be comprised between 20 mm and 100 mm, or between 50 mm and 100 mm. The height can be comprised between 5 mm and 50 mm, or between 10 mm and 30 mm.

FIG. 9 also shows three smaller cut-holes 304 above the large cut-hole 303 and three smaller cut-holes 304 below the large cut-hole 303. All small cut-holes 304 must have the same size, to be suitable for the insertion of the fastening elements 207. In this specific example, each cut-hole 304 has a width of 6 mm±0.5 mm and a height of 2 mm±0.1 mm. The position of the small cut-holes 304 is defined in relation to the large cut-hole 303. The three top cut-holes 304 which are above the large cut-hole 303 are positioned at a distance of 12 mm±1 mm from the middle line (a) of large cut-hole 303 parallel to the direction X1 of insertion of connector 101, and the three bottom cut-holes 304 are positioned symmetrically in respect to the top ones. Looking at the middle line (b) of the large cut hole 304 perpendicular to the line (a) and to the direction X1, the left top and bottom small cut-hole 304 are located at a distance of 24.5 mm±1 mm from the middle line (b) and the right top and bottom small cut-holed 304 are located at a distance of 30.5 mm±1 mm from the middle line (b) and the central top and bottom small cut-holed 304 are next to the middle line (b) and extending toward the cut-holes 304 on the right. All the dimensions provided have been provided just as examples, and can vary within a certain range.

Figure 10:
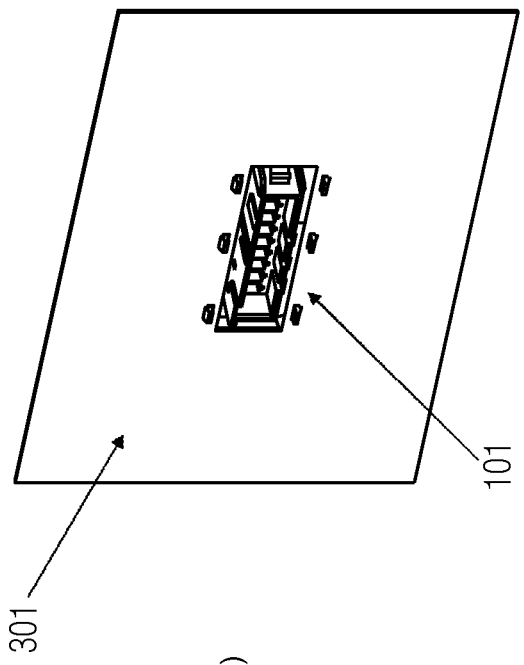
FIG. 10 is a perspective view of an outer side of the wall with a connector body of the connector assembly.

FIG. 10 shows the outer side of the wall or refrigerator side 301 with the first end 102 of the connector body 101 and the fastening elements 207 inserted in the wall 300.

Figures 11, 12:
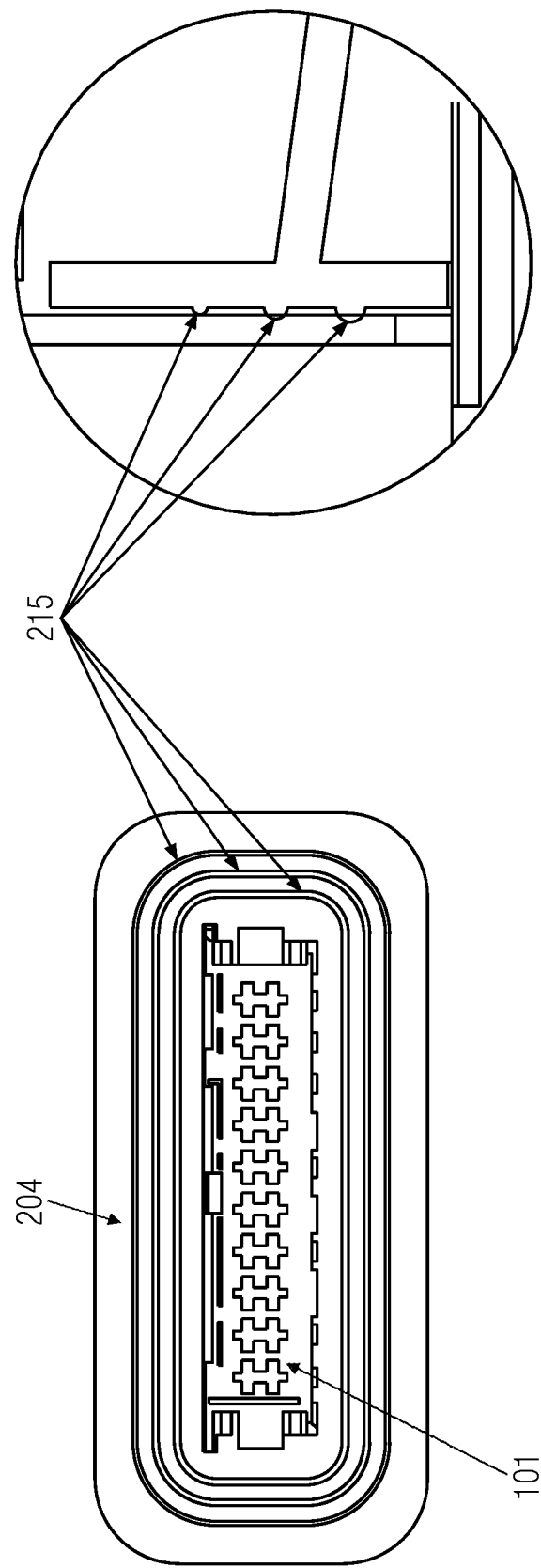
FIG. 11 is a front view of a flange of the connector body.
FIG. 12 is a detail sectional view of the flange and the wall.

FIG. 11 shows the front face of the flange 204 in which are visible three lips or rings 215 following the outside profile rectangular, rounded in the corners, of the face of the flange 204. The lips 215 extend with a rounded profile in the direction of insertion of the connector X1. Looking at FIG. 11, there is a distance of about 1 cm between each circumferential lip or ring 215 and the following one. But the distance can vary and be settled according to the size of the flange 204 and type of wall 300. The distance can be between 3 mm and 20 mm, or between 5 mm and 10 mm. More irregular walls may require a flange 204 with more rings 215 closer to each other to better adapt to the irregularity of the wall's foaming side 302. The lips 215 are indeed configured to be deformed and be compressed against the wall 300 on the foaming side 302 to assure a uniform contact pressure of the lips 215 against the wall 300. The borders of the lips 215 follow the same shape of the flange 204 outer circumference, being rounded on the corners. This helps to minimize a rigidity in the corners in which more sections of the lip 215 meet if those section would be rectilinear such as in a lip 215 of rectangular shape. The lower rigidity given on the rounded corners of the lips 215 of the present invention, impairs a reliable, stable and strong sealing between the flange 204, at the front face of the shell 200, and the wall 300.

FIG. 12 shows a cross section of the flange 204 and lips 215 abutting against the wall 300. Each lip 215 has a rounded profile, which is suitable to be pressed against the wall, therefore protecting the flange 204 and the wall 300 surfaces from rubbing against each other.

The lips or rings 215 are made of the same material as the protective shell 200.

Figure 14:
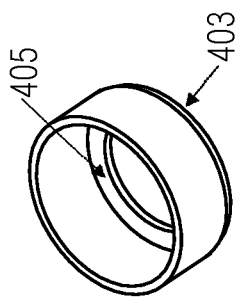
FIG. 14 is a perspective view of a portion of the cap.
Figure 13:
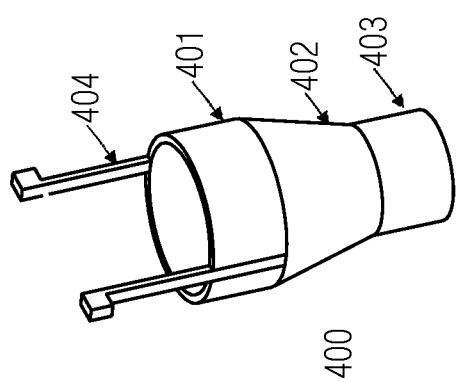
FIG. 13 is a perspective view of a cap.

FIGS. 13 and 14 schematically shows a three-dimensional frontal view of the cap 400 and a portion of the cap 403. The cap 400 is configured to be connected to the back portion of the protective shell 200.

As shown in FIG. 13, the cap 400 consists of three sections, two cylindrical sections 401 and 403 with a conically narrowing middle section 402 connecting the two cylindrical sections 401 and 403. The two cylindrical portions 401 and 403 have different diameters. The portion 401 with larger diameter is on one side directly connected to the protective shell 200, and on the other side connected to the middle conical portion 402 which tapers towards the section 403 having a narrowed diameter. The cap 400 is first inserted by sliding over the back portion of the protective shell 200 and then fixed to the shell 200 by two or more fastening elements 404. The fastening elements 404 or latches are flexible elements, protruding from the portion 401, comprising straight segments and hooks portions position at the tip of the segments. The elements 404 can bend along a direction that is perpendicular to the insertion direction before connecting to the shell 200, to facilitate the mounting of the cap 500 on the shell 200. Or the elements 404 can be configured to slide along the insertion direction over the shell 200. The hooks of the fastening elements 404 are configured to lock with counterpart elements located on the surface of the back portion 202 of the protective shell 200.

The cap 400 incorporates the cables 217 coming out the protective shell 200 and, because of the tapered shape, holds the cables 217 together. The cap 400 may even have a further protective function, as it further prevents entry of the foam, and sealing function. The portion 403 of the cap 400, has at his bottom part an annular collar 405 protruding towards the inside, which has a smaller diameter of the portion 403. The annular collar 405 function as sealing element against the cables 217, sealing the overall connector assembly 100 from the space outside, so to protect the connector 101 and related electrical connections.

Figure 15:
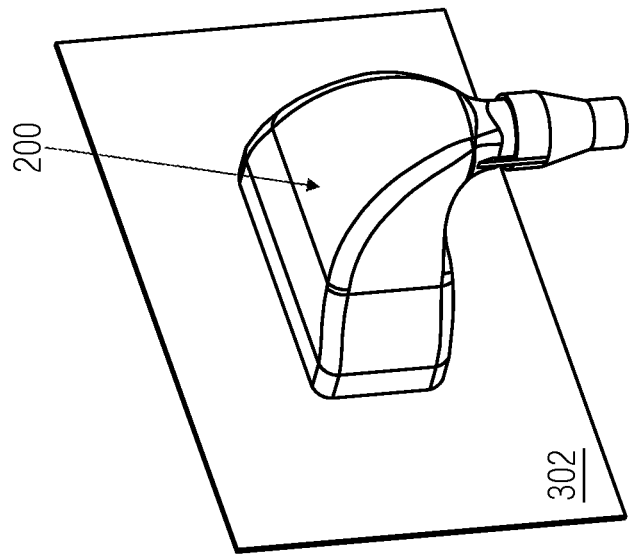
FIG. 15 is a rear perspective view of the connector assembly with the cap.

FIG. 15 schematically shows a three-dimensional rear view of the connector assembly 100 with the cap 400 attached to the end of the back portion 202.

While the present invention has been described with reference to the embodiments described above, it is clear for the skilled person that it is possible to realize several modifications, variations and improvements of the present invention in the light of the teaching described above and within the ambit of the enclosed claims without departing from the scope of protection of the invention.

Figure 16:
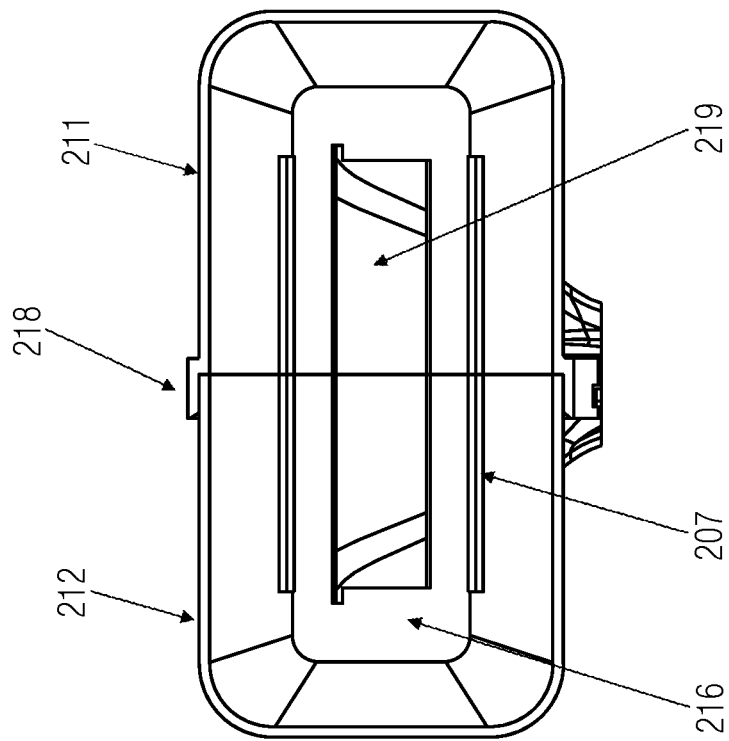
FIG. 16 is a front perspective view of a protective shell of a connector assembly according to another embodiment.

FIG. 16 schematically shows a three-dimensional front view of the protective shell 200 of the connector assembly 100 according to another embodiment of the present invention. In this embodiment, only two fastening elements 207 are provided, one on the upper portion of the flange 104, one on the lower portion, so to have one fastening element 207 above and one fastening element below the main connector body 101. Each of the fastening elements 207 replaces multiple fastening elements, has a sliding portion 208 which is a planar surface extending along the width of the front plane or internal wall 216 of the flange and a locking portion 209 on its end. The sliding portion 208 enables a sliding of the connector assembly 100 through the cut-out hole 303 along the direction X1, and the locking portion 209 on the tip end portion secures or blocks the connector assembly 100 in the wall 300 along the direction X1. In this case, the smaller cut holes 304 shown in FIG. 9 can also be made as a continuous slit, to accommodate the fastening element 207 that is continuous in length for better strength. This will help the locking elements to bear the load of the entire assembly with the hanging mass of the wires.

When the connector 101 is fixed to the wall 300, the side of the locking portion 209 is configured to abut against the outer side or surface of said wall 300, which is opposite to the inner side or surface on which the flange portion 204 abuts. The fixing elements 207 guarantee at the same time the conveying and sliding of the mount connector 101 and the fixing of the connector assembly 100 to the wall 300. The distance between the locking portion 209 and the face of the flange 204, corresponding to the length of the straight sliding portion 208, it is designed in such a way that the flange 204 is slightly deflected against the refrigerator's inside wall, so that that a gap free contact with the wall 300 is established, and the system is tight against foam.

FIG. 16 also shows an overlapping sealing structure 218 which seals the two substantially symmetrical halves of the protective shell 200 along the conjunction line. The sealing structure 218 can be an additional external structure, or can consists of a prolongation of one of the two halves of the shell 200, so that basically one half will overlap on the other half.

Figure 17:
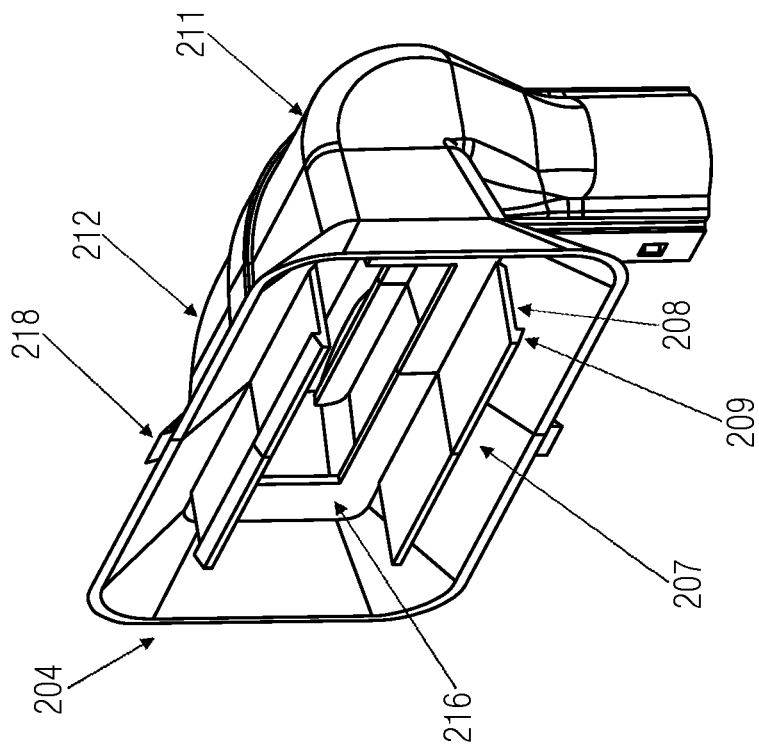
FIG. 17 is a front view of the protective shell of FIG. 16.

FIG. 17 is a two-dimensional front view of the connector protective shell 200 of the connector assembly 100 according this last embodiment of the present invention and showing additionally the geometry to the front plane or internal wall 216 and one example of a cut out 219 for the connector in the front plane 216.

The invention is not to be limited by the specific illustrative embodiments, but only by the scope of the appended claims. For example. even if only RAST 2.5 and RAST 5 connectors have been described, it is evident that the present invention can be used with any type of connector.

What is claimed is:

1. A connector assembly for installation on a wall, comprising:
    a main connector body introduced into a cut-out hole of the wall along a first direction; and
    a protective shell positioned on an inner side of the wall, the protective shell protecting the main connector body from an insulation foam entering the main connector body when the protective shell and the main connector body are foamed in place, the protective shell including a front portion, a receptacle formed at the front portion and receiving a second end of the main connector body, a flange extending from and surrounding the receptacle, and a lead-through channel formed at a back portion of the protective shell, the flange is attached on the inner side of the wall and covers the cut-out hole, the lead-through channel has an internal flap routing a cable through the back portion in a meandering manner, the internal flap is inclined with respect to the lead-through channel.

2. The connector assembly of claim 1, wherein the protective shell has a pair of halves that are substantially symmetrical around a second direction perpendicular to the first direction.

3. The connector assembly of claim 2, wherein the halves are connected by a film hinge.

4. The connector assembly of claim 2, wherein the halves are connected by a pair of complementary latching elements.

5. The connector assembly of claim 2, wherein the halves are sealed by an overlapping sealing structure.

6. The connector assembly of claim 1, wherein the flange has a concavity facing the inner side of the wall.

7. The connector assembly of claim 6, wherein the flange is deformed when in contact with the inner side of the wall.

8. The connector assembly of claim 1, wherein the flange has a pair of fastening elements attaching the flange to the wall.

9. The connector assembly of claim 8, wherein the fastening elements are protruding elements inserted in a plurality of additional cut-out holes surrounding the cut-out hole that receives the main connector body.

10. The connector assembly of claim 8, wherein the fastening elements are integrally formed with the flange.

11. The connector assembly of claim 1, wherein the flange has a plurality of lips extending with a rounded profile along the first direction.

12. The connector assembly of claim 1, wherein the internal flap is inclined at least 60 degrees with respect to the lead-through channel.

13. The connector assembly of claim 1, further comprising a cap having a conically narrowing middle section attached to the back portion of the protective shell.

14. The connector assembly of claim 1, wherein the front portion of the shell and the back portion of the shell are arranged at a relative angle between 80 and 100 degrees.

15. The connector assembly of claim 14, wherein the front portion of the shell and the back portion of the shell are arranged at a relative angle of 90 degrees.

16. The connector assembly of claim 1, wherein the connector assembly is used in a refrigerator application.

* * * * *